United States Patent [19]
Woerner

[11] 3,845,844
[45] Nov. 5, 1974

[54] WHEEL CHOCKS FOR TANDEM WHEELS
[76] Inventor: Joseph F. Woerner, 2102-Chamber of Commerce Building, Houston, Tex.
[22] Filed: Mar. 19, 1973
[21] Appl. No.: 342,765

[52] U.S. Cl. .................................. 188/32, 188/2 R
[51] Int. Cl. .............................................. B60t 3/00
[58] Field of Search ................ 188/2 R, 4 R, 32, 74

[56] References Cited
UNITED STATES PATENTS
| 1,789,458 | 1/1931 | Bureau | 188/32 |
| 2,773,564 | 12/1956 | Garard | 188/32 |
| 3,512,613 | 5/1970 | Peterson | 188/32 |
| 3,547,228 | 12/1970 | Wiley | 188/32 |
| 3,700,077 | 10/1972 | Harder | 188/32 |

Primary Examiner—Duane A. Reger

[57] ABSTRACT

A wheel chock adapted to be paired with another substantially identical chock to form a wheel chock assembly for use between the tandem wheels of a vehicle. A rigid arm having a flat sidewall generally in a central plane of the chock extends from an angular sidewall of the chock. When the chocks are positioned between tandem wheels, the arms are pivotally connected and set in a raised position. Downward pressure against the arms move the chocks out laterally into engagement with the wheels and the ground and prevent the wheels from rotating. Means are provided to distribute the force away from the center of the chock. Means are also provided to serve as a step for foot pressure in depressing the arms to lock the tandem wheels and as a handle to raise the arms. Other features of the invention are disclosed in the specification.

10 Claims, 8 Drawing Figures

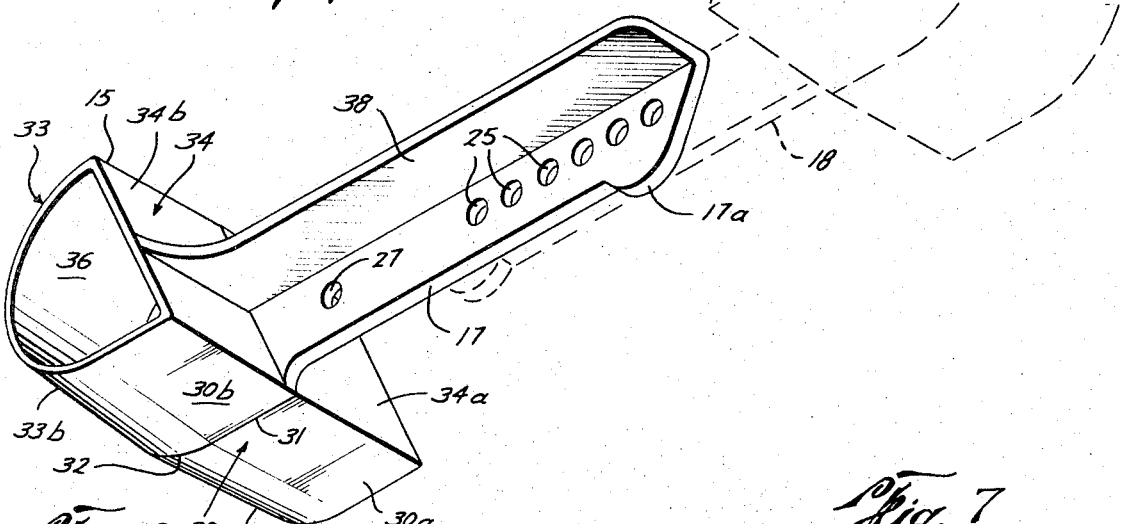
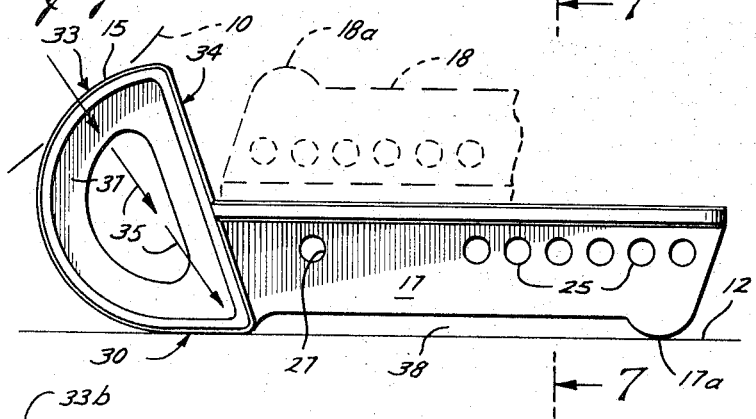
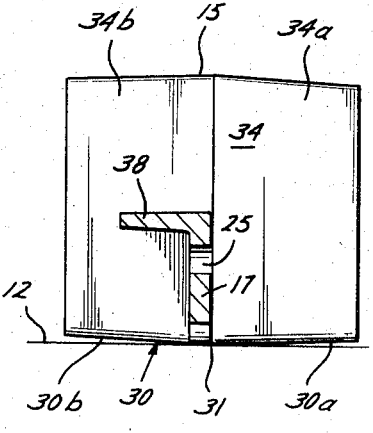
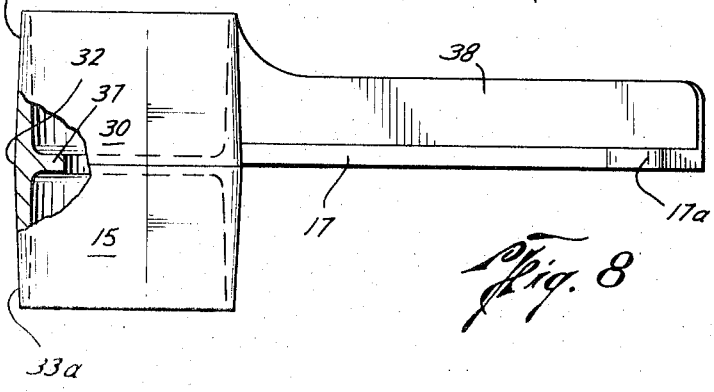

WHEEL CHOCKS FOR TANDEM WHEELS

BACKGROUND OF THE INVENTION

U.S. Pat. Nos. 3,547,228 and 3,700,077 illustrate wheel chock assemblies for tandem wheels. These devices, however, are relatively complex and expensive, and each of the wheel chocks making up the chock assembly cannot be cast from the same mold. It would be highly advantageous and the present invention is directed to a wheel chock assembly in which the individual wheel chock can be cast from the same mold and which are relatively inexpensive and simple but yet are very effective and convenient to use.

SUMMARY OF THE INVENTION

The present invention is directed to a wheel chock assembly having a pair of wheel chocks which can be cast from the same mold, which are relatively simple and inexpensive and yet effective and are easy to use.

Accordingly, one object of the invention is to provide a wheel chock adapted to be paired or used in combination with another identical chock between the tandem wheels of a vehicle to prevent them from turning.

Another object of the invention is to reduce the cost of manufacture of wheel chocks by casting identical wheel chocks from a match plate made from a single pattern.

Another object of the invention is to provide a wheel chock design adapted for ease in setting and with provisions for releasing when used with another chock of similar design between the tandem wheels of a vehicle.

Another object of the invention is to have a series of spaced holes in the arms of a pair of adjustable wheel chocks in order to pivotally connect the arms at a point where the chocks will make contact with tandem wheels of different diameter and varied spacing.

Another object of my invention is to provide a ridge around the surface of a wheel chock that is aligned with the lateral movement of the chock toward the wheel when the chock is being set which distributes the force away from the central portion of the chock and out along its surface.

Still another object of my invention is to provide a base portion on a rotating type wheel chock that will distribute the force, caused by the wheel trying to turn against the chock, away from the center of the chock.

BRIEF DESCRIPTION OF THE DRAWINGS

FIG. 5 is an isometric view of the improved wheel chock taken from the underside.

FIG. 6 is a side view in more detail of the wheel chock in FIG. 5.

FIG. 7 is a vertical section taken on the line 7—7 of FIG. 6.

FIG. 8 is a bottom plan view of the wheel chock of FIG. 5.

DETAILED DESCRIPTION OF THE PREFERRED EMBODIMENT

Figure 1:
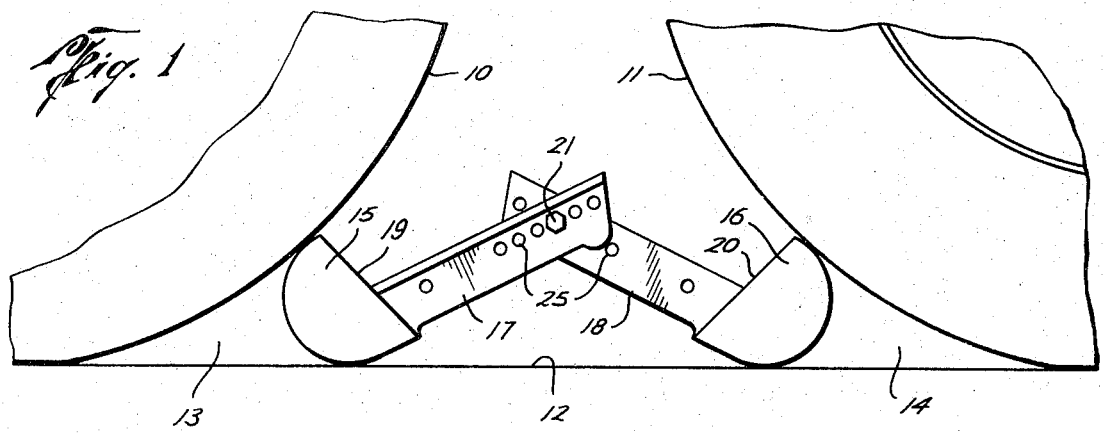
FIG. 1 is a side view of a pair of identical wheel chocks between tandem wheels and in a released position.

Referring to the drawings, the tandem wheels of a vehicle are indicated at 10 and 11. The wheels rest on the ground or surface 12 and form wedged shaped spaces 13 and 14 between their outer peripheries and the ground or surface 12. The pair of identical wheel chocks 15 and 16 go into the wedged shaped spaces 13 and 14 in order to prevent the wheels from turning.

The pair of identical wheel chocks 15 and 16 have rigid arms 17 and 18 extending out from angular sidewalls 19 and 20. The arms are arranged side by side and joined together by pivotal means, such as a bolt and nut as shown at 21.

Figure 2:
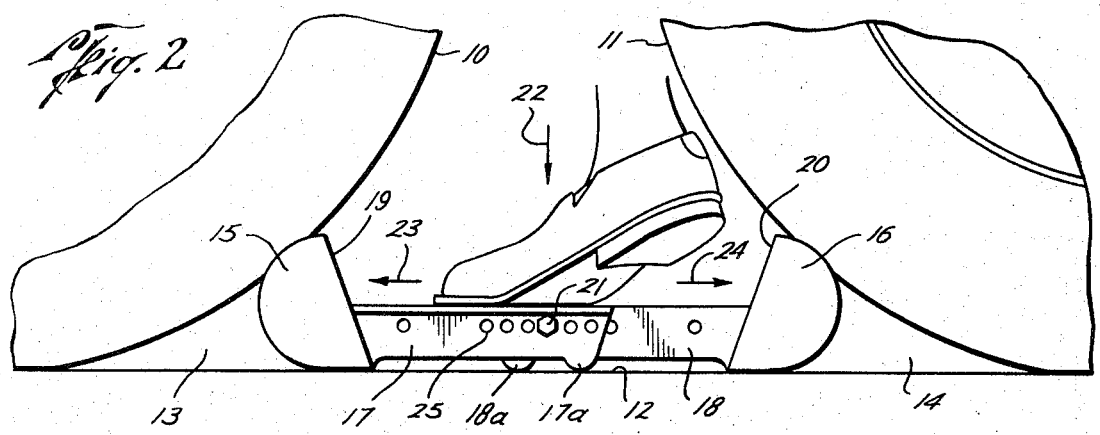
FIG. 2 is a view similar to FIG. 1 but with the chocks forced down and out into a locked position.

The connected pair of wheel chocks are first placed in position between the tandem wheels 10 and 11 with the arms raised as shown in FIG. 1. Downward movement as indicated by the arrow 22 in FIG. 2 causes the chocks to rotate about their axes and to move out laterally into the spaces 13 and 14, as indicated by the arrows 23 and 24. As the chocks move into the spaces between the wheels and the ground, they firmly engage both surfaces.

During downward movement of the arms, the pivot 21 passes through a plane between the axis of both chocks. When the pivot has passed through the plane it will not return voluntarily. If the downward movement is stopped just after passing through the plane, the chocks will be locked out against the wheels and the ground.

Each identical arm is provided with a downwardly extending boss or stop member 17a and 18a adapted to contact the ground when the arms are in a horizontal position. This horizontal position finds the pivot 21 at the desired position, having just passed through the plane between the axes of the chocks.

Each arm is equipped with a series of spaced holes 25. The pivotal connection between the arms may be made through any set of holes that position the chocks properly for various sized wheels and different axle spacing. Should the user find that no two combinations of holes exactly fit his requirements, he can clamp the chock arms together in their proper position and drill a new set of holes through the arms in the space provided below the series 25.

Figure 3:
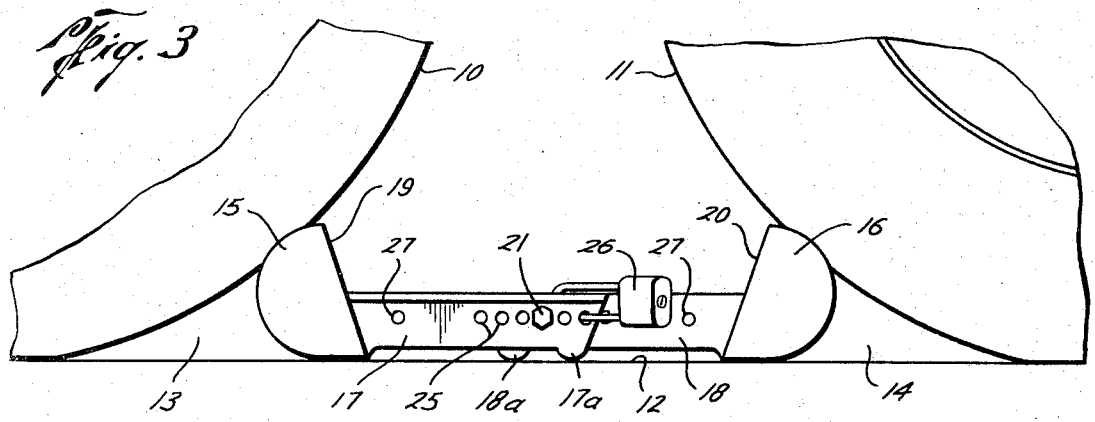
FIG. 3 is a view like FIG. 2 illustrating the use of a padlock in conjunction with the wheel chocks.

When the arms are horizontal as shown in FIG. 3, holes other than the two used for pivot 21 will normally be aligned. Any set so aligned may be selected to receive a padlock 26. The padlock will prevent the upward movement of the arms, used to release the chocks from their locked down position. However, should the chocks be adjusted for use between wheels requiring the closest setting, none of the other holes in series 25 will be aligned. Accordingly, each arm has an additional hole 27 so positioned as to align itself with the outermost hole of the series 25 on the opposite arm and to receive the padlock 26.

Figure 4:
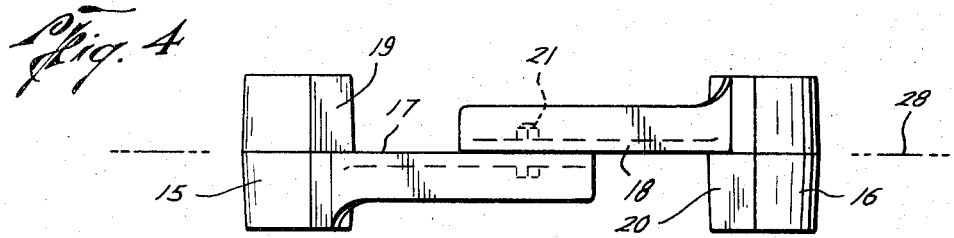
FIG. 4 is a top plan view of a pair of identical wheel chocks showing the relationship between them when arranged for use.

As shown in FIG. 4, the arms 17 and 18 are secured to sidewalls at a position where one side of the arm lies in a central plane 28 passing through its respective chock member. When the chocks are assembled for use, this central plane 28 will be common to both chocks. Lateral movement of the chocks will parallel this plane and the pressure against the chocks will be equally distributed on either side of center. In addition, the opposite outward forces setting the chocks will be in line and act to balance each other and set the chocks with equal pressure. This in line movement and equalization of pressure is advantageously utilized by the provision of a ridge line indicated by 31 and 32 around each chock lying in the plane 28.

Referring to FIG. 5 through FIG. 8, a description of one wheel chock 15 is given for convenience as both are identical in every respect. The outer surface of chock 15 comprises a base portion generally indicated at 30 which contacts the ground 12 when the arm 17 has reached a horizontal position. The base portion 30 consists of two flat surfaces 30a and 30b at an obtuse angle to each other forming a ridge 31 along their intersection. The ridge 31 lies in the central plane 28 and is tangential with a ridge 32 on the half round surface generally indicated at 33. The ridge 32 is formed along the intersection of two half round conical surfaces 33a and 33b. Each surface 33a and 33b is tangential to flat surfaces 30a and 30b, respectively. The half round conical surfaces 33a and 33b terminate at the intersection of two angular flat surfaces 34a and 34b which comprise a flat angular sidewall generally indicated at 34. The angular sidewall 34 rises from the outer edge of the base 30 upwardly and outwardly.

When the chock 15 is first positioned for setting, the ridges formed around its outer surfaces contact the ground surface and the wheels which normally have rubber tires. Lateral movement of chock 15 into space 13 along plane 28, in which these ridges lie, is facilitated in its beginning by the in line contact of the ridges against the wheels and the ground surface. As the chock continues into the narrowing space 13, the ridge 32 will deform the tire until its surface conforms to a partial area of the opposed conical contour of the chock. This deformation effects a better purchase between the tire, the chock and the ground surface. If the ground surface is yieldable, the same result will be achieved by the ridge 31.

The base portion 30 begins well out past the center of the chock member 15. If the wheel attempts to rotate the vector forces indicated by arrows 35 will be distributed from their origin at the area of contact on the conical half round surfaces out past the center of the chock over the area of the extended base portion. This extended base portion further aids in retaining the wheel against movement.

In order to use a minimum amount of material in molding chock 15, it is desirable to have a hollow interior 36. A hollow interior will, however, weaken the chock and so a web 37 is provided at the center to strengthen it.

The rigid arm 17 has a right angle extension 38 along its upper edge. The extension 38 is directed away from the side of the arm lying in the plane 28 and runs for the entire length of the arm. The extension 38 strengthens the arm. When two chocks are placed in operative position, their arm extensions provide a platform or step against which foot pressure may be applied. The extensions also provide a hand hold for pulling up to release the chocks.

The boss 17a stops the downward travel of arm 17 in a horizontal position. A space or recessed portion 38 is created between the bottom edge of the arm and the ground when the boss 17a has made contact. Should the chocks be set out so tight that an upward pull on the arm extensions will not release them, a lever acting tool such as a screwdriver may be inserted in the space 38 to raise the arms 17 and 18.

When disassembled, the chocks may be stored within a small area by positioning the arms as shown in FIG. 6 where the chock arm 18 is upside down against the chock arm 17.

The present invention, therefor, is well suited and adapted to attain the objects and ends and has the features mentioned as well as others inherent in it.

While only a presently-preferred embodiment has been described and shown, changes may be made therein without departing from the spirit of the invention as defined by the appended claims.

I claim:

1. A chock assembly for placing between two tandem wheels to prevent them from turning comprising,
   an identical pair of wheel chocks for positioning between the two tandem wheels,
   an identical pair of rigid arms, one each extending from each of the wheel chocks toward each other, the rigid arms having inner facing sides in a plane generally through the transverse center of the wheel chocks, and
   means pivotally connecting the arms together at a point along the arm so that the arms extend upwardly from a surface supporting the tandem wheels when the chock assembly is in nonlocking position between the tandem wheels,
   depressing the arms to a generally horizontal position causing engagement of the chocks with the tandem wheels and the surface thereby preventing the wheels from turning.

2. The chock assembly of claim 1 including
   generally flat sidewalls extending upwardly and outwardly on each of the wheel chocks facing each other,
   said rigid arms extending from the sidewalls.

3. The wheel chock assembly of claim 1 including
   generally horizontal extensions extending from the rigid arms adjacent their upper portions and away from the inner sides thereby forming steps for depressing the arms and handles for raising the arms.

4. The chock assembly of claim 1 including
   a downwardly extending boss adjacent the outer end of each of the arms extending generally to the same level as the bottom of the chock when the chock assembly is in locking position,
   the bottom portion of each arm being raised above the bottom of the chock and the boss,
   whereby the boss provides a stop when the arm is depressed to a generally horizontally position and provides a space between the bottom of the arm and the surface for insertion of a releasing tool.

5. The wheel chock of claim 1 where
   the means pivotally connecting the arms together include a plurality of openings along each of the arms, and
   a pivotal connection extending through the openings thereby making the chock assembly adjustable linearly for positioning between and locking tandem wheels of different spacing.

6. The chock assembly of claim 1 where each of the wheel chocks include
a generally flat base portion,
a generally flat sidewall extending upwardly and outwardly from the inner portion of the base portion, and
a generally round portion extending from the upper portion of the sidewall and the outer portion of the base.

7. The chock assembly of claim 6 where each chock includes a ridge lying in a central plane transversely through the chock and which extends along the bottom of the base and along the rounded portion of the chock whereby line contact is provided with the ground and the wheel in the direction of lateral movement of the chock assembly thereby facilitating such lateral movement and deforming a tire surface on the wheel to the confirmation of a substantial area on the chocks.

8. A wheel chock comprising, a chock member having a generally flat base portion, a generally rounded outer portion, and a generally flat and outwardly inclined surface extending from an inner portion of the base portion and an upper portion of the rounded portion,
a rigid arm extending from the generally flat and inclined surface having a generally flat sidewall in line with the transverse center of the chock member, and
means for pivotally connecting the arm to an arm of another chock member,
a downwardly extending boss adjacent the extending end of the arm, said boss extending to substantially the same level as the base portion of the chock member,
the nether portion of the arm being spaced above a line extending from the base member to the boss thereby providing a space for the insertion of a releasing tool.

9. A wheel chock comprising,
a generally hollow chock member having a generally flat base portion, a generally rounded outer portion, and a generally flat and outwardly and upwardly inclined surface extending from an inner part of the base portion and to an upper part of the rounded portion,
a plate-like arm extending from the generally flat and inclined surface and having a generally flat sidewall in line with the transverse center of the chock member,
a generally horizontally extending member having a flat upper surface extending from the rigid arm away from its generally flat side,
a ridge extending on the flat base portion's outer surface and the rounded outer portion's surface lying generally in the transverse center of the chock, and a stop member extending downwardly from the rigid arm to generally the same level as the base portion thereby providing a stop when the arm is depressed and providing a recessed portion of the arm for insertion of a releasing tool.

10. A wheel chock assembly comprising,
a pair of wheel chocks as defined in claim 9,
a plurality of openings along the length of the arms of the wheel chocks, and
means inserted through the openings for pivotally securing the arms together.

* * * * *